(12) United States Patent
Anshu

(10) Patent No.: US 11,148,388 B1
(45) Date of Patent: Oct. 19, 2021

(54) THERMOPAQUE GLASS

(71) Applicant: Tilahun Anshu, Lowell, MA (US)

(72) Inventor: Tilahun Anshu, Lowell, MA (US)

( * ) Notice: Subject to any disclaimer, the term of this patent is extended or adjusted under 35 U.S.C. 154(b) by 282 days.

(21) Appl. No.: 16/444,202

(22) Filed: Jun. 18, 2019

(51) Int. Cl.
*B32B 3/26* (2006.01)
*B32B 7/12* (2006.01)
*B32B 5/14* (2006.01)
*B32B 17/10* (2006.01)
*E06B 3/67* (2006.01)
*E06B 3/66* (2006.01)

(52) U.S. Cl.
CPC ............... *B32B 3/26* (2013.01); *B32B 5/147* (2013.01); *B32B 7/12* (2013.01); *B32B 17/10* (2013.01); *B32B 17/1088* (2013.01); *B32B 17/10559* (2013.01); *E06B 3/66* (2013.01); *E06B 3/6715* (2013.01); *B32B 17/10036* (2013.01); *B32B 17/1055* (2013.01); *B32B 17/10165* (2013.01); *B32B 2255/26* (2013.01); *B32B 2307/212* (2013.01); *B32B 2307/41* (2013.01); *B32B 2307/412* (2013.01); *B32B 2307/416* (2013.01); *B32B 2605/006* (2013.01)

(58) Field of Classification Search
CPC . B32B 3/26; B32B 17/1088; B32B 17/10559; B32B 2307/416; B32B 2605/006; B32B 17/10; B32B 17/10036; E06B 3/6715; E06B 3/66
See application file for complete search history.

(56) References Cited

U.S. PATENT DOCUMENTS

| | | | |
|---|---|---|---|
| 2003/0161997 A1* | 8/2003 | Moran | B32B 17/10036 428/172 |
| 2012/0300306 A1* | 11/2012 | Nagahama | E06B 9/386 359/601 |
| 2018/0281568 A1* | 10/2018 | Nakamura | B32B 17/10752 |

* cited by examiner

*Primary Examiner* — Jasper Saberi

(57) ABSTRACT

The thermopaque glass is a semitransparent structure. The thermopaque glass is configured for use as the transparent material used in a window into a building. The thermopaque glass is a composite laminar structure. The thermopaque glass inhibits the passage of electromagnetic through the window into the building by reflecting a portion of the electromagnetic radiation striking the window away from the building. The thermopaque glass comprises a plurality of lamina and a plurality of interlayered resins. The plurality of interlayered resins assemble the plurality of lamina into the composite structure of the thermopaque glass. Each of the plurality of lamina is a plate selected from the group consisting of a transparent plate and a semitransparent plate.

10 Claims, 2 Drawing Sheets

THERMOPAQUE GLASS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of shaping including layered products characterized by physical structure, more specifically, a product characterized by layers of differing constitution where differences are in the treatment of the layers. (B32B5/147)

Over the last decades, the energy efficiency of new construction has become increasingly important. In general, improved methods of insulation and construction techniques are important in the industry. Windows have been particularly vulnerable to unwanted energy transfers into and out of buildings. While improvements in window casings have been made, improvements in the thermal efficiency of the actual transparent material used in windows have lagged. In addition, transparent material is often brittle and can crack and break easily.

Thermodynamics allows for four types of heat transfer: advection, convection, conduction, and radiation. It is the nature of the properties of transparent material that, with regard to advection and convection, traditional transparent material tends to be a good insulator. Transparent material inhibits the free movement of mass, which prevents thermal energy transfer through the process of advection. Similarly, transparent material inhibits the free movement of fluids and gases, which prevents the thermal energy transfer through convection. Traditional transparent materials, being nonconductive, can be expected to do a reasonable job of preventing energy transfer through conduction. However, its transparent nature makes traditional transparent material a poor choice at preventing energy transfer through radiation.

Clearly, a transparent material that inhibits the transfer of radiant energy through transparent material would be of benefit to the construction industry.

SUMMARY OF INVENTION

The thermopaque glass is a semitransparent structure. The thermopaque glass is configured for use as the transparent material used in a window into a building. The thermopaque glass is a composite laminar structure. The thermopaque glass inhibits the passage of electromagnetic through the window into the building by reflecting a portion of the electromagnetic radiation striking the window away from the building. The thermopaque glass comprises a plurality of lamina and a plurality of interlayered resins. The plurality of interlayered resins assemble the plurality of lamina into the composite structure of the thermopaque glass. Each of the plurality of lamina is a plate selected from the group consisting of a transparent plate and a semitransparent plate.

These together with additional objects, features and advantages of the thermopaque glass will be readily apparent to those of ordinary skill in the art upon reading the following detailed description of the presently preferred, but nonetheless illustrative, embodiments when taken in conjunction with the accompanying drawings.

In this respect, before explaining the current embodiments of the thermopaque glass in detail, it is to be understood that the thermopaque glass is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the thermopaque glass.

It is therefore important that the claims be regarded as including such equivalent construction insofar as they do not depart from the spirit and scope of the thermopaque glass. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
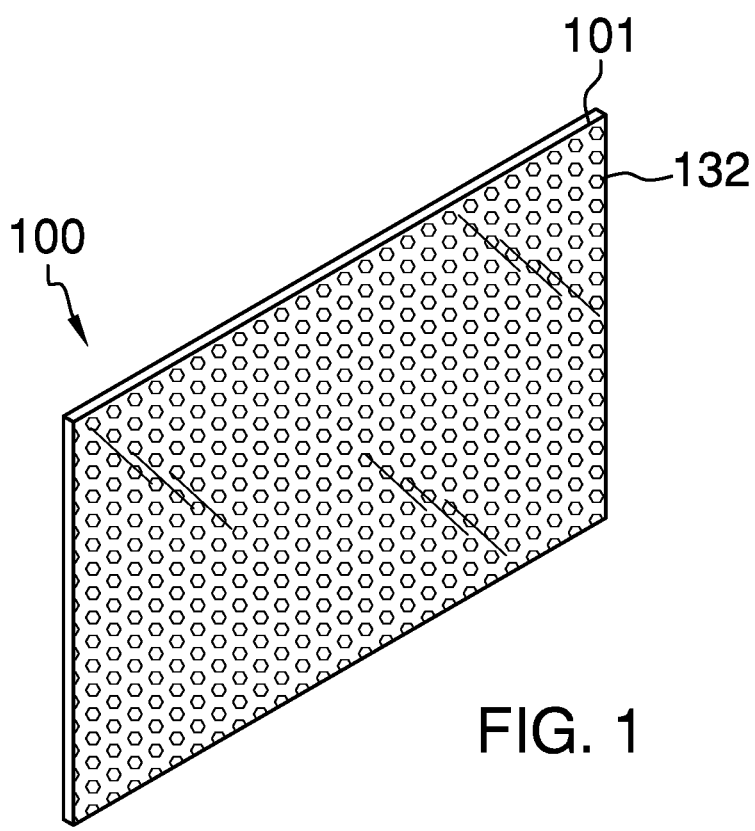
FIG. 1 is a perspective view of an embodiment of the disclosure.
Figure 2:
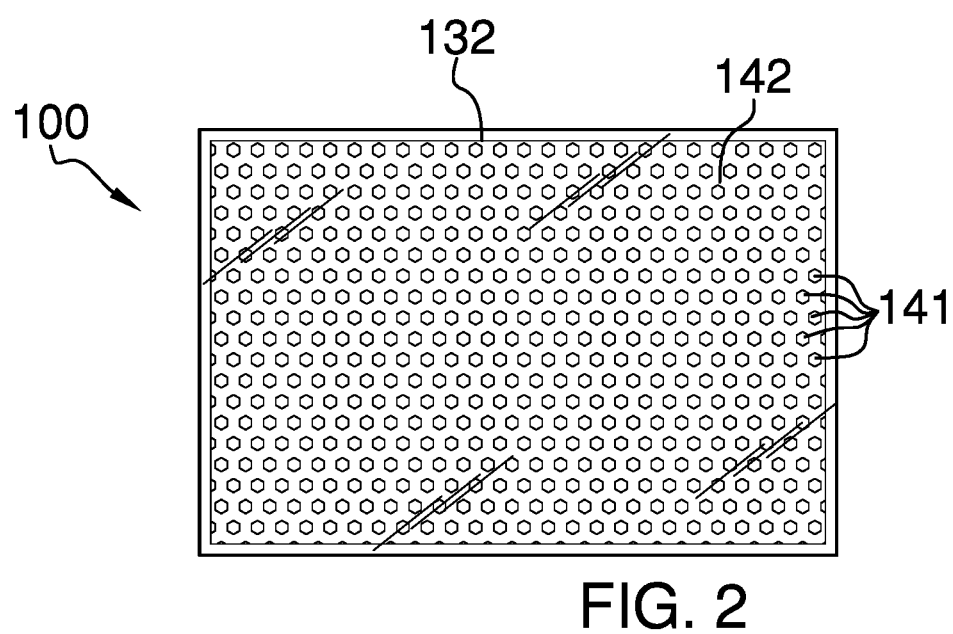
FIG. 2 is a front view of an embodiment of the disclosure.
Figure 3:
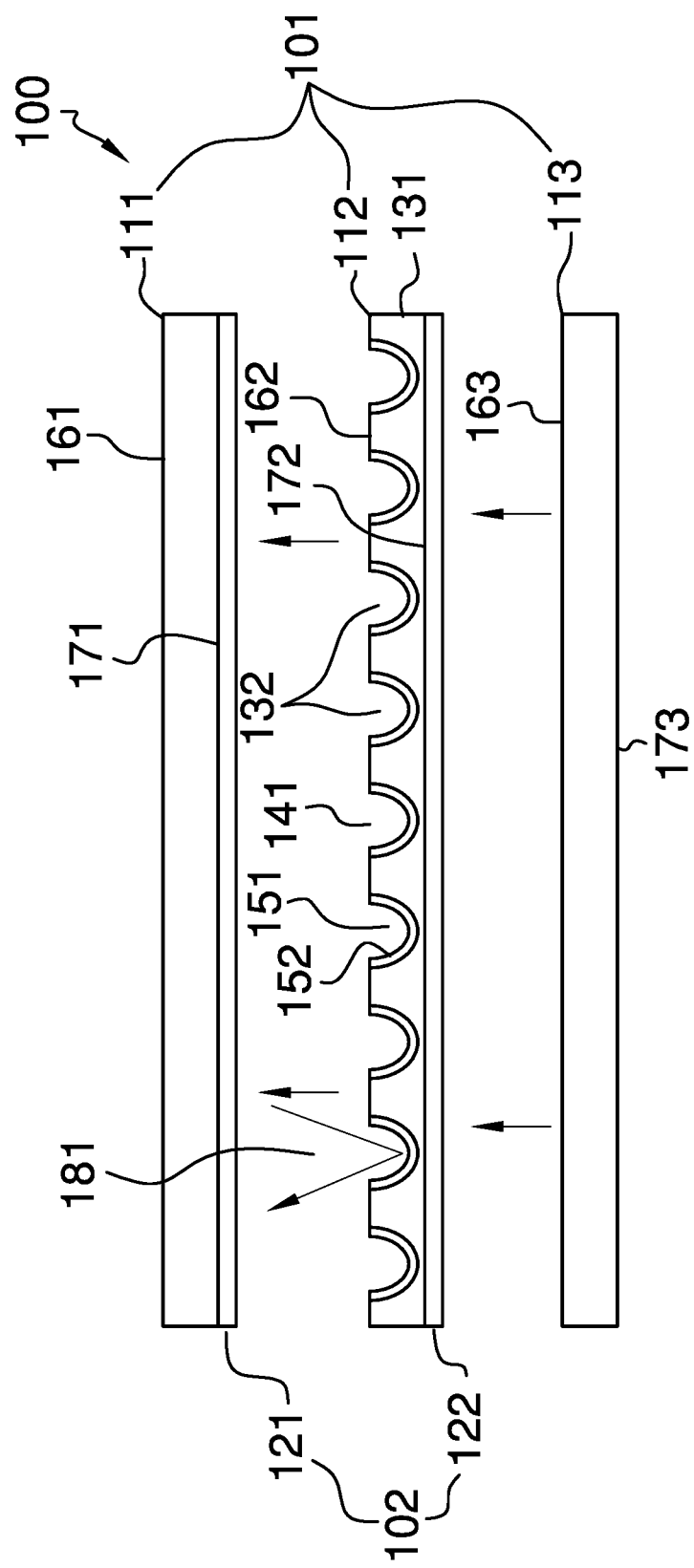
FIG. 3 is an exploded view of an embodiment of the disclosure.

Detailed reference will now be made to one or more potential embodiments of the disclosure, which are illustrated in FIGS. 1 through 3.

The thermopaque glass 100 (hereinafter invention) is a semitransparent structure. The invention 100 is configured for use as the transparent material used in a window into a building. The invention 100 is a composite laminar structure. The invention 100 inhibits the passage of electromagnetic through the window into the building by reflecting a portion of the electromagnetic radiation 181 striking the window away from the building. The invention 100 comprises a plurality of lamina 101 and a plurality of interlayered resins 102. The plurality of interlayered resins 102 assembles the plurality of lamina 101 into a composite prism structure. Each of the plurality of lamina 101 is a plate selected from the group consisting of a transparent plate and a semitransparent plate.

The plurality of lamina 101 is a composite structure. The plurality of lamina 101 is a disk-shaped structure formed in the manner of a composite prism. Each of the plurality of lamina 101 is selected from the group consisting of a transparent disk structure and a semitransparent disk structure. The plurality of lamina 101 are formed such that a portion of the electromagnetic radiation 181 that strikes the plurality of lamina 101 from the exterior side of the plurality of lamina 101 is reflected back to the exterior side of the plurality of lamina 101. By exterior side of the plurality of lamina 101 is meant the first exterior face 161 of the exterior plate 111 of the plurality of lamina 101. The exterior plate 111 and the first exterior face 161 are described in greater detail elsewhere in this disclosure.

The plurality of lamina 101 comprises an exterior plate 111, an intermediate plate 112, and an interior plate 113. The exterior plate 111, the intermediate plate 112, and the interior plate 113 are stacked to form a composite prism structure. The location of the intermediate plate 112 is between the exterior plate 111 and the interior plate 113.

The exterior plate 111 is a transparent structure. The exterior plate 111 is a disk-shaped structure. The exterior plate 111 forms the exterior structure of the plurality of lamina 101 when the invention 100 is installed in a building. The exterior plate 111 is further defined with a first exterior face 161 and a first interior face 171. The first exterior face 161 is the face of the disk structure of the exterior plate 111 that is distal from the third interior face 173 of the interior plate 113. The first interior face 171 is the face of the disk structure of the exterior plate 111 that is proximal to the second exterior face 162 of the intermediate plate 112.

The interior plate 113 is a transparent structure. The interior plate 113 is a disk-shaped structure. The interior plate 113 forms the interior structure of the plurality of lamina 101 when the invention 100 is installed in a building. The interior plate 113 is geometrically identical to the exterior plate 111. The interior plate 113 is further defined with a third exterior face 163 and a third interior face 173. The third exterior face 163 is the face of the disk structure of the interior plate 113 that is proximal to the second interior face 172 of the intermediate plate 112. The third interior face 173 is the face of the disk structure of the interior plate 113 that is distal from the first exterior face 161 of the exterior plate 111.

The intermediate plate 112 is a transparent structure. The intermediate plate 112 is a disk-shaped structure. The intermediate plate 112 is the intermediate structure of the plurality of lamina 101. The intermediate plate 112 is geometrically similar to both the exterior plate 111 and the interior plate 113. The applicant prefers that the intermediate plate 112 is geometrically identical to the exterior plate 111 and the interior plate 113. The intermediate plate 112 comprises a plate structure 131 and a plurality of paraboloid structures 132. The intermediate plate 112 is further defined with a second exterior face 162 and a second interior face 172. The second exterior face 162 is the face of the disk structure of the intermediate plate 112 that is proximal to the first interior face 171 of the exterior plate 111. The second interior face 172 is the face of the disk structure of the intermediate plate 112 that is proximal to the third exterior face 163 of the interior plate 113.

The plate structure 131 is a transparent structure. The plate structure 131 is a disk-shaped structure. The plate structure 131 forms the intermediate structure of the plurality of lamina 101 when the invention 100 is installed in a building.

Each of the plurality of paraboloid structures 132 is a reflective structure. Each of the plurality of paraboloid structures 132 is formed in second exterior face 162 of the intermediate plate 112. Each of the plurality of paraboloid structures 132 is geometrically similar. Each of the plurality of paraboloid structures 132 reflects electromagnetic radiation 181 received from the direction of the exterior plate 111 back towards the exterior plate 111. Each of the plurality of paraboloid structures 132 is a structure commonly known as a parabolic mirror. The plurality of paraboloid structures 132 comprises a collection of individual paraboloid structures 141 in a staggered pattern 142.

Each individual paraboloid structure 141 is a negative space formed into the intermediate plate 112 through the second exterior face 162 of the intermediate plate 112. Each individual paraboloid structure 141 is formed in the shape of a paraboloid. Each individual paraboloid structure 141 forms a parabolic mirror within the structure of the plate structure 131. The center axis of the paraboloid of each individual paraboloid structure 141 is perpendicular to the second exterior face 162 of the intermediate plate 112. The position of the center axes of each individual paraboloid structure 141 of the plurality of paraboloid structures 132 are interlaced on the second exterior face 162 in an alternating grid pattern referred to as a staggered pattern 142. Each individual paraboloid structure 141 comprises a paraboloid cavity 151 and a reflective coating 152.

The paraboloid cavity 151 of each individual paraboloid structure 141 forms the physical paraboloid shaped negative space that is formed in the second exterior face 162 of the intermediate plate 112.

The reflective coating 152 is a coating that is applied to the concave surface of the paraboloid cavity 151. The reflective coating 152 is a reflective resin. The application of the reflective coating 152 to the paraboloid cavity 151 creates the semitransparent nature of the plate structure 131. The reflective coating 152 is configured to reflect all the light received by the individual paraboloid structure 141.

The staggered pattern 142 offsets the center axis of each individual paraboloid structure 141 relative to the center axes of the remaining plurality of paraboloid structures 132 such that more individual paraboloid structures 141 will fit on the second exterior face 162 of the intermediate plate 112 than would be possible with a non-interlaced arrangement.

Each of the plurality of interlayered resins 102 is an adhesive resin that attaches the intermediate plate 112 to a plate selected from the group consisting of the exterior plate 111 and the interior plate 113 to form the composite prism structure of the plurality of lamina 101.

The plurality of interlayered resins 102 comprises a first interlayered resin 121 and a second interlayered resin 122. The first interlayered resin 121 attaches the exterior plate 111 to the intermediate plate 112. The second interlayered resin 122 attaches the interior plate 113 to the intermediate plate 112.

The first interlayered resin 121 is an adhesive resin. The first interlayered resin 121 is a transparent polymer structure. The first interlayered resin 121 is applied as a coating to the first interior face 171 of the exterior plate 111. The first interlayered resin 121 attaches the first interior face 171 of the exterior plate 111 to the second exterior face 162 of the intermediate plate 112 such that the exterior plate 111 and the intermediate plate 112 are joined to form a composite prism.

The second interlayered resin 122 is an adhesive resin. The second interlayered resin 122 is a transparent polymer structure. The second interlayered resin 122 is applied as a coating to the second interior face 172 of the intermediate plate 112. The second interlayered resin 122 attaches the second interior face 172 of the intermediate plate 112 to the third exterior face 163 of the interior plate 113 such that the intermediate plate 112 and the interior plate 113 are joined to form a composite prism.

The following definitions were used in this disclosure:

Adhesive: As used in this disclosure, an adhesive is a chemical substance that can be used to adhere two or more objects to each other. Types of adhesives include, but are not limited to, epoxies, polyurethanes, polyimides, or cyanoacrylates, silicone, or latex based adhesives.

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Cavity: As used in this disclosure, a cavity is an empty space or negative space that is formed within an object.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Coating: As used in this disclosure, a coating refers to a substance that is applied to the exterior surface of an object such that the coating forms a new exterior surface of the object. A coating is commonly said to be formed as a layer. Paint is an example of a common coating material.

Composite: As used in this disclosure, composite refers to a two-dimensional or three-dimensional structure that that is formed from two or more distinctly identifiable sub-structures.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Concave: As used in this disclosure, concave is used to describe: 1) a surface that resembles the interior surface of a sphere; or, 2) a function with a curvature structure wherein a chord that connects any two points of the function will be lesser than (graphically below) or equal to the value of the function at any point along the chord.

Convex: As used in this disclosure, convex is used to describe: 1) a surface that resembles the outer surface of a sphere; or, 2) a function with a curvature structure wherein a chord that connects any two points of the function will be greater than (graphically above) or equal to the value of the function at any point along the chord.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Electromagnetic Radiation: As used in this disclosure, electromagnetic radiation refers to an interaction between electric fields and magnetic fields that is capable of transmitting energy through a vacuum.

Epoxy: As used in this disclosure, an epoxy is a polymer-based adhesive that is characterized by the use of an epoxide functional group. Epoxy resin is a synonym for epoxy.

Exterior: As used in this disclosure, the exterior is used as a relational term that implies that an object is not contained within the boundary of a structure or a space.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Inert: As used in this disclosure, inert is an adjective that is applied to an object, system, or chemical reaction. Inert means that the object, system, or chemical reaction is incapable of motion or activity or is otherwise unreactive.

Interior: As used in this disclosure, the interior is used as a relational term that implies that an object is contained within the boundary of a structure or a space.

Interlace: As used in this disclosure, to interlace means to align a series of linear objects selected in an alternating manner. The linear objects are selected from two or more groups of linear objects. The alternating manner is a function of the group the linear object is identified with.

Intermediate: As used in this disclosure, the term intermediate refers to a location that lies between a first object and a second object.

Intermediate Structure: As used in this disclosure, an intermediate structure refers is an inert structure that attaches a first object to a second object.

Lamina: As used in this disclosure, a lamina refers to an individual layer of a composite structure that is formed from a plurality of layers.

Light: As used in this disclosure, light refers to electromagnetic radiation that illuminates an area. Illumination is a synonym for light, particularly in cases where a measure of the amount of light in a space is called for.

Mirror: As used in this disclosure, a mirror is a surface that is designed to reflect light with a minimum of dispersion or absorption. A mirror may or may not be formed with curved surfaces that are used to concentrate or disperse the light that reflects off the mirror.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Opaque: As used in this disclosure, opaque refers to an object or material that prevents the passage of radiation through the object or material.

Paraboloid: As used in this disclosure, a paraboloid is a type of quadric surface. An elliptic paraboloid is described by the equation: $(x^2/a^2)+(y^2/b^2)=z$. The hyperbolic paraboloid is described by the equation: $(x^2/a^2)-(y^2/b^2)=z$. A paraboloid of rotation refers to an elliptic paraboloid where $a=b$. Unless stated otherwise within the specification, the use of the term paraboloid refers to an elliptic paraboloid.

Plate: As used in this disclosure, a plate is a smooth, flat and semi-rigid or rigid structure that has at least one dimension that: a) is of uniform thickness; and b) that appears thin relative to the other dimensions of the object. Plates often have a rectangular appearance. Plates often have a disk-like structure. The face of the plate is a surface of the plate selected from the group consisting of: a) the surface of the plate with the greatest surface area; b) the surface of the plate that is distal from the surface of the plate with the greatest surface area. The edges of the plate comprise the surfaces of the plate that would not be considered faces as defined above. As defined in this disclosure, plates may be made of any material, but are commonly made of metal, plastic, and wood. When made of wood, a plate is often referred to as a board or a plank.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Reflection: As used in this disclosure, a reflection refers to the change of direction of a wave that occurs when the wave impacts a surface.

Resin: As used in this disclosure, a resin refers to a polymer in a liquid phase.

Semitransparent: As used in this disclosure, semitransparent refers to an object that is partially transparent.

Spectrum: As used in this disclosure, a spectrum refers to the distribution and amplitude of the component frequencies of a source of electromagnetic radiation. Spectrums are typically organized and displayed by frequency or frequency range.

Transparent: As used in this disclosure, transparent refers to a material that allows light to pass through the material without significant scattering such that an object can be clearly seen through the material.

Window: As used in this disclosure, a window is an opening formed in a structure that is fitted with glass or other transparent material in a frame to that allows the passage of light through the structure.

With respect to the above description, it is to be realized that the optimum dimensional relationship for the various components of the invention described above and in FIGS. 1 through 3 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A semitransparent composite structure comprising
a plurality of lamina and a plurality of interlayered resins;
wherein the plurality of interlayered resins assembles the plurality of lamina;
wherein the semitransparent composite structure is a composite prism structure;
wherein the semitransparent composite structure inhibits the passage of electromagnetic radiation through a window into the semitransparent composite structure by reflecting a portion of the electromagnetic radiation striking the semitransparent composite structure away from the semitransparent composite structure;
wherein the plurality of lamina are formed such that a portion of the electromagnetic radiation that strikes the plurality of lamina from the exterior side of the plurality of lamina is reflected back to the exterior side of the plurality of lamina;
wherein the plurality of lamina is a disk-shaped structure formed in the manner of a composite prism;
wherein each of the plurality of lamina is selected from the group consisting of a transparent disk structure and a semitransparent disk structure;
wherein the plurality of lamina comprises an exterior plate, an intermediate plate, and an interior plate;
wherein the exterior plate, the intermediate plate, and the interior plate are stacked to form a composite prism structure;

wherein the location of the intermediate plate is between the exterior plate and the interior plate;

wherein each of the plurality of interlayered resins is an adhesive resin that attaches the intermediate plate to a plate selected from the group consisting of the exterior plate and the interior plate to form the composite prism structure of the plurality of lamina;

wherein the exterior plate is a transparent, disk-shaped structure;

wherein the exterior plate is further defined with a first exterior face and a first interior face;

wherein the interior plate is a transparent, disk-shaped structure;

wherein the interior plate is further defined with a third exterior face and a third interior face;

wherein the interior plate is geometrically identical to the exterior plate;

wherein the intermediate plate is a transparent, disk-shaped structure;

wherein the intermediate plate is the intermediate structure of the plurality of lamina;

wherein the intermediate plate comprises a plate structure and a plurality of paraboloid structures;

wherein the plurality of paraboloid structures are formed in the plate structure;

wherein the intermediate plate is further defined with a second exterior face and a second interior face.

2. The semitransparent composite structure according to claim 1 wherein the plate structure is a transparent structure;

wherein the plate structure is a disk-shaped structure;

wherein the plate structure forms the intermediate structure of the plurality of lamina.

3. The semitransparent composite structure according to claim 2 wherein each of the plurality of paraboloid structures is a reflective structure;

wherein each of the plurality of paraboloid structures is formed in the second exterior face of the intermediate plate.

4. The semitransparent composite structure according to claim 3 wherein each of the plurality of paraboloid structures reflects electromagnetic radiation received from the direction of the exterior plate back towards the exterior plate.

5. The semitransparent composite structure according to claim 4 wherein each of the plurality of paraboloid structures is geometrically similar.

6. The semitransparent composite structure according to claim 5 wherein the plurality of paraboloid structures comprises a collection of individual paraboloid structures in a staggered pattern;

wherein each individual paraboloid structure is a negative space formed into the intermediate plate through the second exterior face of the intermediate plate;

wherein each individual paraboloid structure is formed in the shape of a paraboloid.

7. The semitransparent composite structure according to claim 6 wherein each individual paraboloid structure forms a parabolic mirror within the structure of the plate structure;

wherein the center axis of the paraboloid of each individual paraboloid structure is perpendicular to the second exterior face of the intermediate plate;

wherein the position of the center axes of each individual paraboloid structure of the plurality of paraboloid structures are interlaced on the second exterior face in an alternating grid pattern.

8. The semitransparent composite structure according to claim 7 wherein each individual paraboloid structure comprises a paraboloid cavity and a reflective coating;

wherein the paraboloid cavity of each individual paraboloid structure forms the physical paraboloid shaped negative space that is formed in the second exterior face of the intermediate plate;

wherein the reflective coating is a coating that is applied to the concave surface of the paraboloid cavity;

wherein the reflective coating is a reflective resin;

wherein the application of the reflective coating to the paraboloid cavity creates the semitransparent nature of the plate structure;

wherein the reflective coating is configured to reflect all the light received by the individual paraboloid structure.

9. The semitransparent composite structure according to claim 8 wherein the plurality of interlayered resins comprises a first interlayered resin and a second interlayered resin;

wherein the first interlayered resin attaches the exterior plate to the intermediate plate;

wherein the second interlayered resin attaches the interior plate to the intermediate plate;

wherein the first interlayered resin is an adhesive resin;

wherein the first interlayered resin is a transparent polymer structure;

wherein the first interlayered resin is applied as a coating to the first interior face of the exterior plate;

wherein the first interlayered resin attaches the first interior face of the exterior plate to the second exterior face of the intermediate plate such that the exterior plate and the intermediate plate are joined to form a composite prism;

wherein the second interlayered resin is an adhesive resin;

wherein the second interlayered resin is a transparent polymer structure;

wherein the second interlayered resin is applied as a coating to the second interior face of the intermediate plate;

wherein the second interlayered resin attaches the second interior face of the intermediate plate to the third exterior face of the interior plate such that the intermediate plate and the interior plate are joined to form a composite prism.

10. The semitransparent composite structure according to claim 9 wherein the intermediate plate is geometrically identical to the exterior plate and the interior plate.

* * * * *